(12) United States Patent
Leo et al.

(10) Patent No.: US 11,373,434 B2
(45) Date of Patent: Jun. 28, 2022

(54) DISPLAY DEVICE WITH FINGERPRINT IDENTIFICATION FUNCTION UNDER SCREEN

(71) Applicant: JADARD TECHNOLOGY INC., Shenzhen (CN)

(72) Inventors: Hon-Yuan Leo, Shenzhen (CN); Jung-Tse Lee, Shenzhen (CN); Sheng-Hsiung Lin, Shenzhen (CN); Qing-Shan Yan, Shenzhen (CN)

(73) Assignee: JADARD TECHNOLOGY INC., Shenzhen (CN)

( * ) Notice: Subject to any disclaimer, the term of this patent is extended or adjusted under 35 U.S.C. 154(b) by 0 days.

(21) Appl. No.: 17/029,351

(22) Filed: Sep. 23, 2020

(65) Prior Publication Data
US 2021/0350104 A1 Nov. 11, 2021

(30) Foreign Application Priority Data

May 8, 2020 (CN) .......................... 202010382153.2

(51) Int. Cl.
| | |
|---|---|
| *G06V 40/13* | (2022.01) |
| *F21V 8/00* | (2006.01) |
| *G02F 1/1333* | (2006.01) |
| *G02F 1/1335* | (2006.01) |
| *G02F 1/1368* | (2006.01) |

(52) U.S. Cl.
CPC ....... *G06V 40/1318* (2022.01); *G02B 6/0055* (2013.01); *G02F 1/1368* (2013.01); *G02F 1/13338* (2013.01); *G02F 1/133514* (2013.01)

(58) Field of Classification Search
CPC .................................................... G06K 9/0004
See application file for complete search history.

(56) References Cited

U.S. PATENT DOCUMENTS

| | | | | |
|---|---|---|---|---|
| 2016/0018701 | A1* | 1/2016 | Tseng | ................ G02F 1/133603 349/62 |
| 2017/0372114 | A1* | 12/2017 | Cho | ...................... G06F 1/1626 |
| 2018/0164638 | A1* | 6/2018 | Yoon | ..................... G06K 9/0004 |
| 2019/0034020 | A1* | 1/2019 | He | ....................... G06K 9/00107 |
| 2019/0258107 | A1* | 8/2019 | Fujii | .................. G02F 1/133512 |
| 2020/0073447 | A1* | 3/2020 | Zhang | .................. G06F 1/1626 |
| 2021/0063816 | A1* | 3/2021 | He | ........................... G06F 21/32 |

FOREIGN PATENT DOCUMENTS

| | | | | |
|---|---|---|---|---|
| CN | 209486694 | | 10/2019 | |
| CN | 110678874 | | 1/2020 | |
| EP | 3059660 | A1 * | 8/2016 | ........... G06F 3/0421 |
| TW | I672621 | B | 9/2019 | |

\* cited by examiner

*Primary Examiner* — Alexander P Gross
(74) *Attorney, Agent, or Firm* — ScienBiziP, P.C.

(57) ABSTRACT

A fingerprint-recognition function in a backlit display device includes a cover plate, a display panel, a backlight module, and a fingerprint recognition module. The cover plate has an operating surface defining a touchable fingerprint identification area. The backlight module emits light for the display panel to display images and, as a first detection light, backlighting incident on the fingerprint identification area reflected by a fingerprint is taken and recognized by the recognition module. Along a thickness direction of the display device, a projection of the fingerprint identification module on the cover plate at least partially overlaps with the fingerprint identification area, and supplementary side-mounted sources emitting non-visible light enhance the accuracy of detection of the recognition module.

11 Claims, 13 Drawing Sheets

DISPLAY DEVICE WITH FINGERPRINT IDENTIFICATION FUNCTION UNDER SCREEN

FIELD

The subject matter herein generally relates to display devices.

BACKGROUND

A self-illuminating display device generally includes a cover plate, a display panel on a side of the cover plate, and a fingerprint identification module on a side of the display panel away from the cover plate. When a finger touches the cover plate, light reflected from the finger falls onto the fingerprint identification module. The fingerprint identification module can recognize the fingerprint according to the light it reflects. For display devices which are not self-illuminating, a backlight module on a side of the display panel away from the cover plate is further included, and the fingerprint identification module is on a side of the backlight module away from the display panel. The backlight module cannot transmit the light reflected from the cover plate. Therefore, when a finger touches the cover plate, the light reflected by the finger cannot be incident on the fingerprint identification module, and the fingerprint cannot be recognized.

The lack of optical fingerprint identification technology in display devices including backlight modules is problematic, the optical fingerprint recognition technology should not be limited by the type of display device.

Therefore, there is room for improvement in the art.

BRIEF DESCRIPTION OF THE DRAWINGS

Implementations of the present disclosure will now be described, by way of embodiment, with reference to the attached figures.

DETAILED DESCRIPTION

Figure 1:
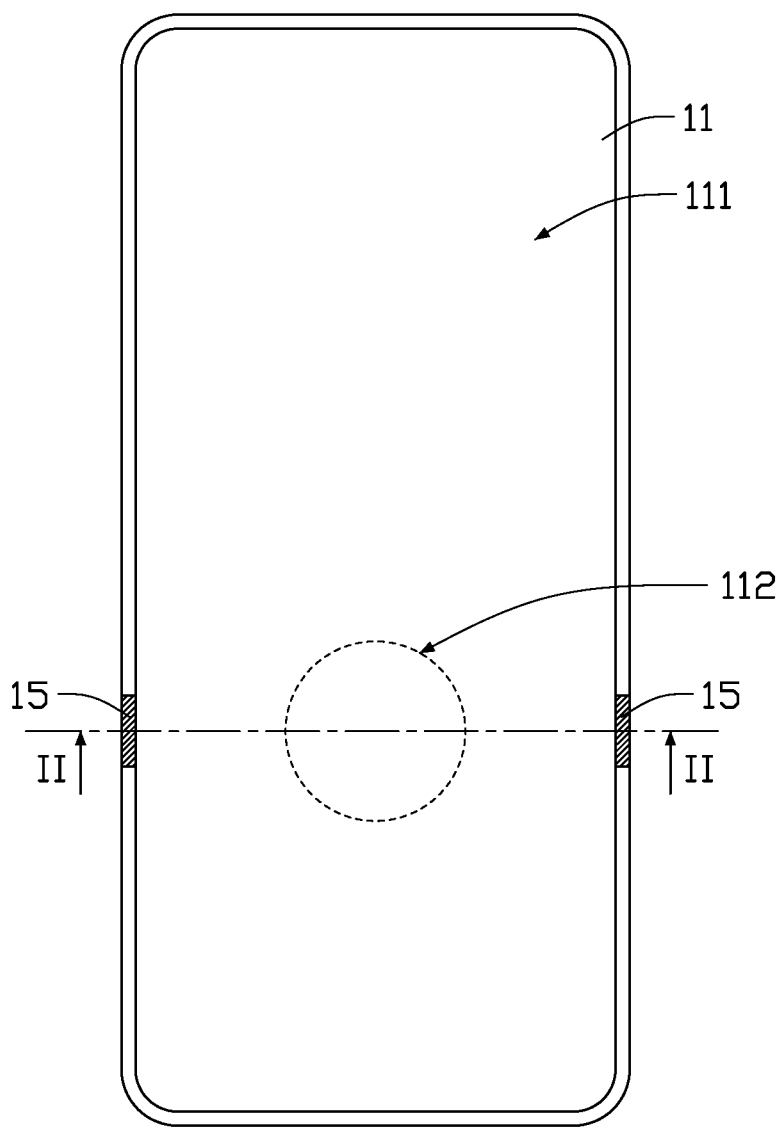
FIG. 1 is a plan view of a display device according to an embodiment.

It will be appreciated that for simplicity and clarity of illustration, where appropriate, reference numerals have been repeated among the different figures to indicate corresponding or analogous elements. In addition, numerous specific details are set forth in order to provide a thorough understanding of the exemplary embodiments described herein. However, it will be understood by those of ordinary skill in the art that the exemplary embodiments described herein may be practiced without these specific details. In other instances, methods, procedures, and components have not been described in detail so as not to obscure the related relevant feature being described. Also, the description is not to be considered as limiting the scope of the exemplary embodiments described herein. The drawings are not necessarily to scale and the proportions of certain parts may be exaggerated to better illustrate details and features of the present disclosure.

The term "comprising" when utilized, means "including, but not necessarily limited to"; it specifically indicates open-ended inclusion or membership in the so-described combination, group, series, and the like. The disclosure is illustrated by way of example and not by way of limitation in the figures of the accompanying drawings in which like references indicate similar elements. It should be noted that references to "an" or "one" embodiment in this disclosure are not necessarily to the same embodiment, and such references can mean "at least one".

FIG. 1 shows a display device 10 according to an embodiment. The display device 10 is a smart phone. In other embodiments, the display device 10 may be a tablet computer, a wearable device, or the like.

As shown in FIG. 1, the display device 10 includes a cover plate 11. The cover plate 11 is transparent and can display images. In one embodiment, the cover plate 11 may be made of glass. The cover plate 11 has an operating surface 111. The operating surface 111 can receive user finger operations, such as touch, fingerprint identification, and other operations. The operating surface 111 has a fingerprint identification area 112, and the fingerprint identification area is within an area of the operating surface 111 for displaying images. When a finger touches the fingerprint identification area 112, the display device 10 can recognize the fingerprint.

Figure 2:
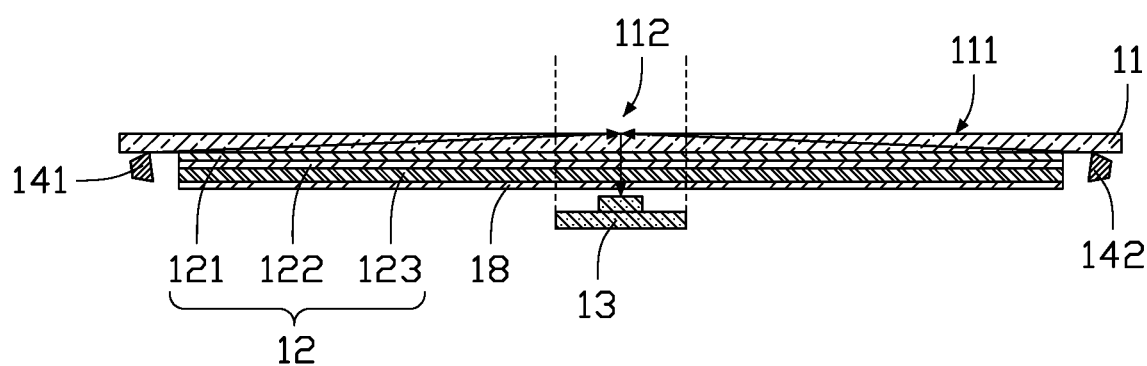
FIG. 2 is a cross-sectional view along line II-II of FIG. 1.

As shown in FIG. 2, the display device 10 includes a display panel 12 and a backlight module 18. The display panel 12 is on a side of the cover plate 11 away from the operating surface 111. The backlight module 18 is on a side of the display panel 12 away from the cover plate 11.

As shown in FIG. 2, the display panel 12 includes a color filter substrate 121, a thin film transistor substrate 123, and a liquid crystal layer 122. The color filter substrate 121 is closer to the cover plate 11 than the thin film transistor substrate 123 to the cover plate 11. The liquid crystal layer 122 is between the color filter substrate 121 and the thin film transistor substrate 123. The backlight module 18 emits backlight. The backlight may be provided by devices including but not limited to light bars, light-emitting diodes, and the like. Different voltages are applied to the thin film transistor substrate 123 and the color filter substrate 121, so that different voltages are generated on each side of the liquid crystal layer 122, causing rotation of the liquid crystal molecules (not shown) in the liquid crystal layer 122. Different voltage differences cause the liquid crystal molecules to rotate at different angles. The backlight has different light intensities when the liquid crystal molecules are rotated at different angles. Different positions of the liquid crystal layer 122 are the result of different voltage differences, the rotation angle of the liquid crystal molecules at different positions is different, and the light intensity of the light emitted from different positions is different. After adjusting the color of the light through the color film substrate 121, an image can be displayed.

As shown in FIG. 2, the display device 10 includes a fingerprint identification module 13. The fingerprint identification module 13 is on a side of the backlight module 18 away from the cover plate 11. The fingerprint identification module 13 can recognize and identify a fingerprint touching the fingerprint identification area 112. The fingerprint identification module 13 receives the light reflected by the finger through an internal photodetection element (e.g., a photodiode), and performs analysis on the light reflected by the finger through a pre-stored program to identify the fingerprint.

Figure 3:
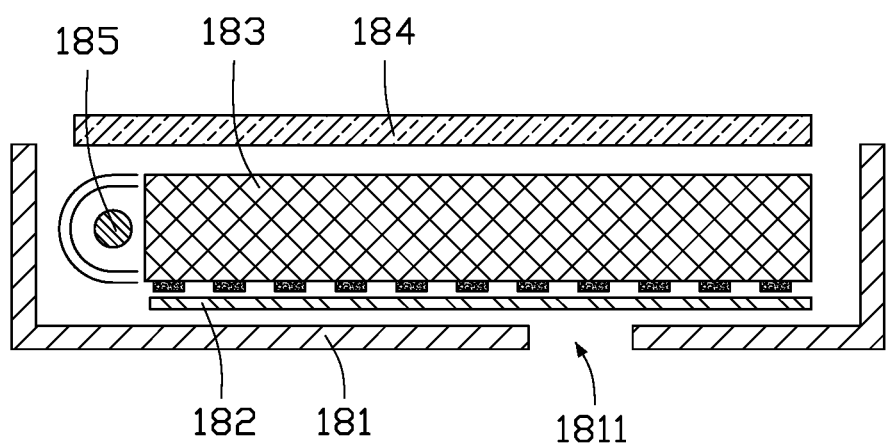
FIG. 3 is a cross-sectional view showing a backlight module in a display device.

As shown in FIG. 3, the backlight module 18 is an edge-light type. The backlight module 18 includes a back plate 181, a reflective sheet 182, a light guide plate 183, and at least one optical film 184. The back plate 181, the reflective sheet 182, the light guide plate 183, and the optical film 184 are stacked in the order stated in a direction away from the fingerprint identification module 13. The back plate 181 is closer to the fingerprint identification module 13 than the reflective sheet 182 to the fingerprint identification module 13. The backlight module 18 includes a light source 185 close to the light guide plate 183. The light source 185 emits light. The light from the rear propagates through the light guide plate 183, and a portion of the backlight is incident on the reflective sheet 182 and reflected by the reflective sheet 182 to the light guide plate 183. The backlight emitted from the light guide plate 183 passes through the optical film 184 and on to the display panel 12 for displaying images.

In one embodiment, the light source 185 is a light bar. In other embodiments, the light source 185 includes a plurality of light-emitting diodes arranged in a strip shape.

In one embodiment, the backlight module 18 is a direct type backlight module. The light source 185 includes a plurality of light-emitting diodes arranged in a matrix. The optical film 184 may be a diffusion film, a light collection film, a brightness enhancement film, or the like. In other embodiments, the backlight module 18 may include a plurality of optical films.

When a finger touches the fingerprint identification area 112, the light incident on the fingerprint identification area 112 is reflected by the finger. The light from behind reflected by the finger is defined as a first detection light. The reflective sheet 182, the light guide plate 183, and the optical film 184 transmit the first detection light. The back plate 181 defines an opening 1811.

Figure 4:
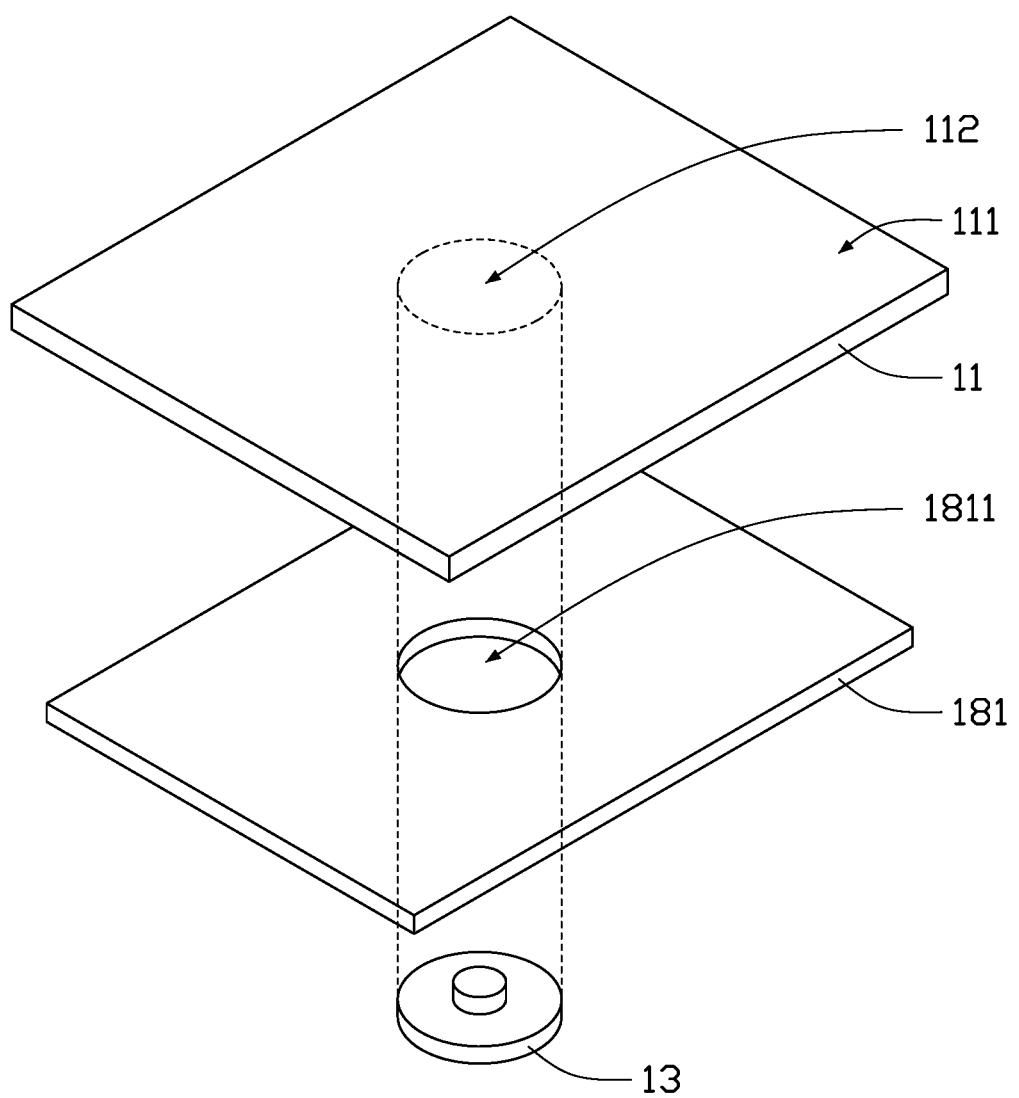
FIG. 4 is a schematic view showing a positional relationship between a fingerprint identification area, an opening, and a fingerprint identification module in the display device of an embodiment.

As shown in FIG. 4, along a thickness direction of the display device 10, there is a complete overlap of a projection of the fingerprint identification module 13 on the cover plate 11, a projection of the opening 1811 on the cover plate 11, and the fingerprint identification area 112. The first detection light passes through the display panel 12 and the backlight module 18, then enters the fingerprint identification module 13. The first detection light enables the fingerprint identification module 13 to identify a known fingerprint.

Figure 5:
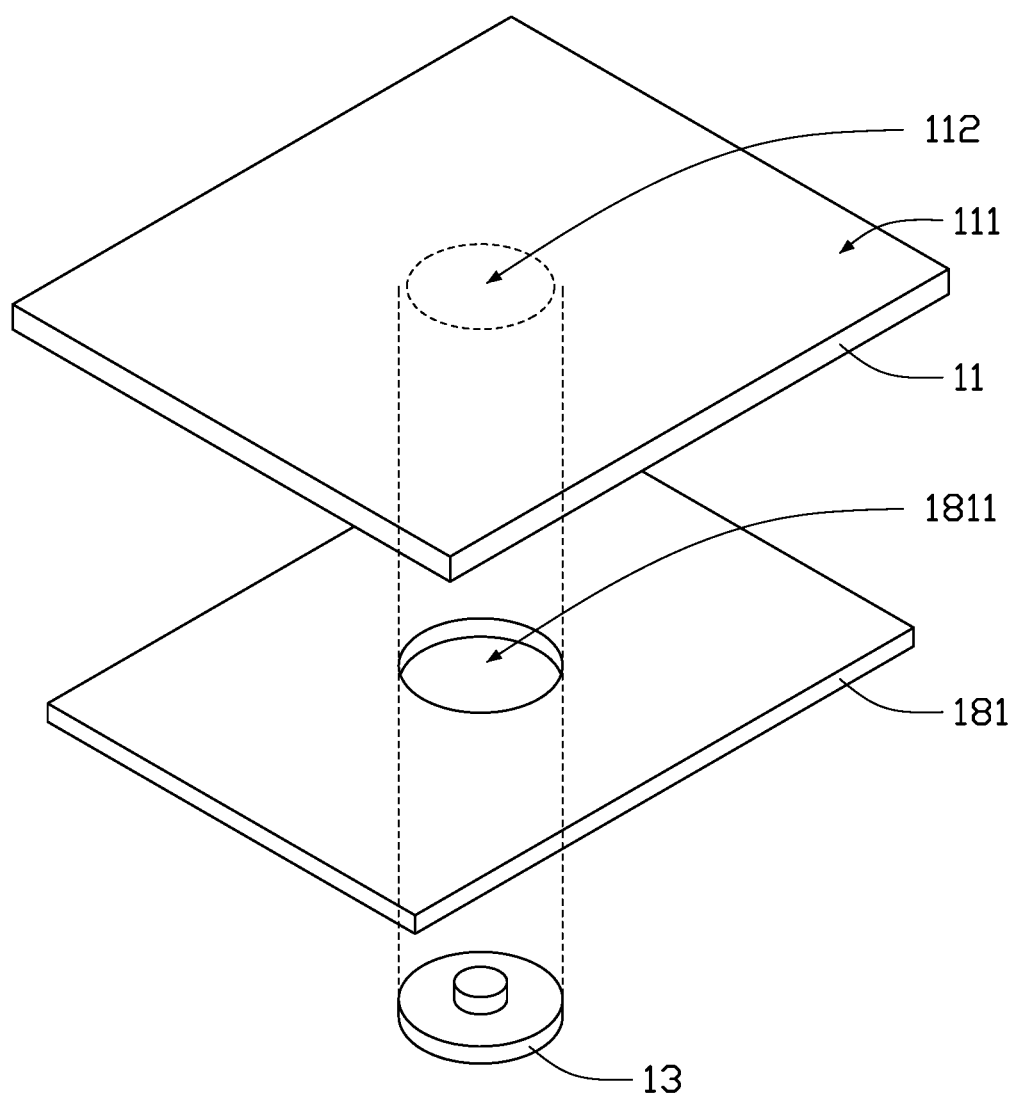
FIG. 5 is a schematic view showing the positional relationship between the fingerprint identification area, the opening, and the fingerprint identification module in the display device of another embodiment.

As shown in FIG. 5, in another embodiment, along the thickness direction of the display device 10, there is a complete overlap of the projection of the fingerprint identification module 13 on the cover plate 11 with the projection of the opening 1811 on the cover plate 11. The projection of the fingerprint identification module 13 on the cover plate 11 and the projection of the opening 1811 on the cover plate 11 both are slightly larger than the fingerprint identification area 112. Most of the light reflected by the fingerprint identification area 112 passes through the opening 1811 and is received by the fingerprint recognition module 13. Light utilization rate is thereby improved.

Figure 6:
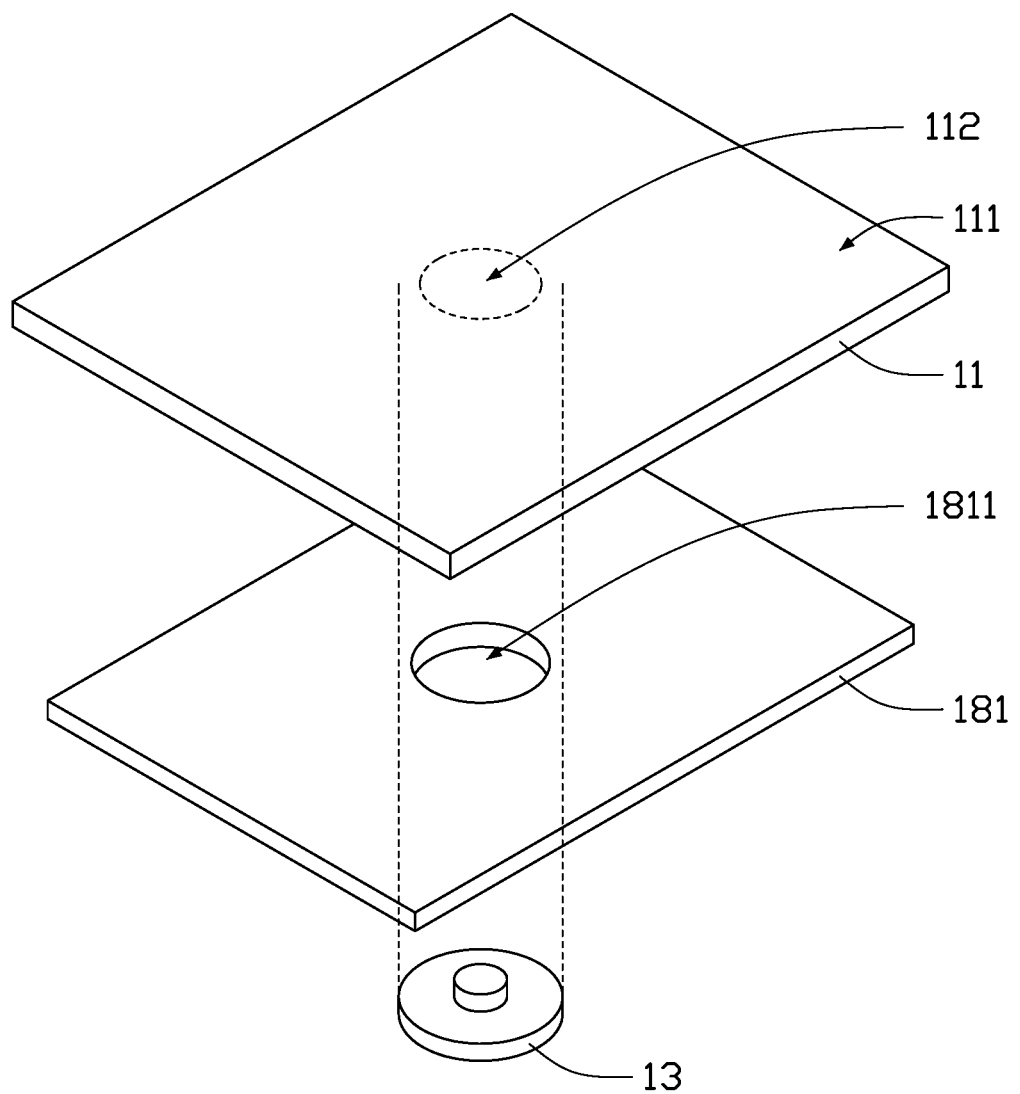
FIG. 6 is a schematic view showing the positional relationship between the fingerprint identification area, the opening, and the fingerprint identification module in the display device of another embodiment.

As shown in FIG. 6, along the thickness direction of the display device 10, the projection of the fingerprint identification module 13 on the cover plate 11 is slightly larger than the projection of the opening 1811 on the cover plate 11, and the projection of the opening 1811 on the cover plate 11 is slightly larger than the fingerprint identification area 112. Most of the first detection light passes through the opening 1811 and most of the light passing through the opening 1811 is received by the fingerprint recognition module 13. Light utilization rate is thereby improved.

As shown in FIG. 2, the display device 10 includes two supplementary light sources 141 and 142. The supplementary light sources 141 and 142 are on the side of the cover plate 11 away from the operating surface 111. The supplementary light sources 141 and 142 are adjacent to the display panel 12.

The supplementary light sources 141 and 142 emit light (reference light) to the fingerprint identification area 112. When the finger touches the fingerprint identification area 112, the reference light is reflected by the finger, and at least part of the reflected reference light is incident on the fingerprint identification module 13, this is a second detection light. The addition of the supplementary light sources 141 and 142 increases the amount of light incident on the finger, and thus the accuracy of the fingerprint identification module 13 in identifying the fingerprint of the finger.

In one embodiment, the transmission direction of the reference light emitted by the supplementary light sources 141 and 142 and the operating surface 111 is inclined, having an inclination angle of less than 90°. The inclination angle shown in FIG. 2 is 1.1157°, the reference light directly enters the fingerprint identification area 112, and the need for components to guide the reference light to the fingerprint identification area 112 is reduced. The angle between the transmission direction of the reference light emitted by the supplementary light sources 141 and 142 and the operating surface 111 differs according to the distance from the supplementary light sources 141 and 142 to the fingerprint identification area 112.

In one embodiment, the wavelength of the reference light is outside the visible spectrum of light to avoid influencing images displayed by the display device 10. In one embodiment, the supplementary light sources 141 and 142 are infrared light emitting diodes, and the reference light is infrared light.

As shown in FIG. 1 and FIG. 2, positions of the cover plate 11 corresponding to the supplementary light sources 141 and 142 are coated with ink 15, an ink transmitting infrared light. The infrared light-transmitting ink 15 is on the same layer as the ink used to shield the traces (not shown) in a border area. The infrared light-transmitting ink 15 can transmit non-visible light but not visible light. Therefore, the infrared light-transmitting ink 15 transmits the reference light but does not transmit the backlighting.

Figure 7:
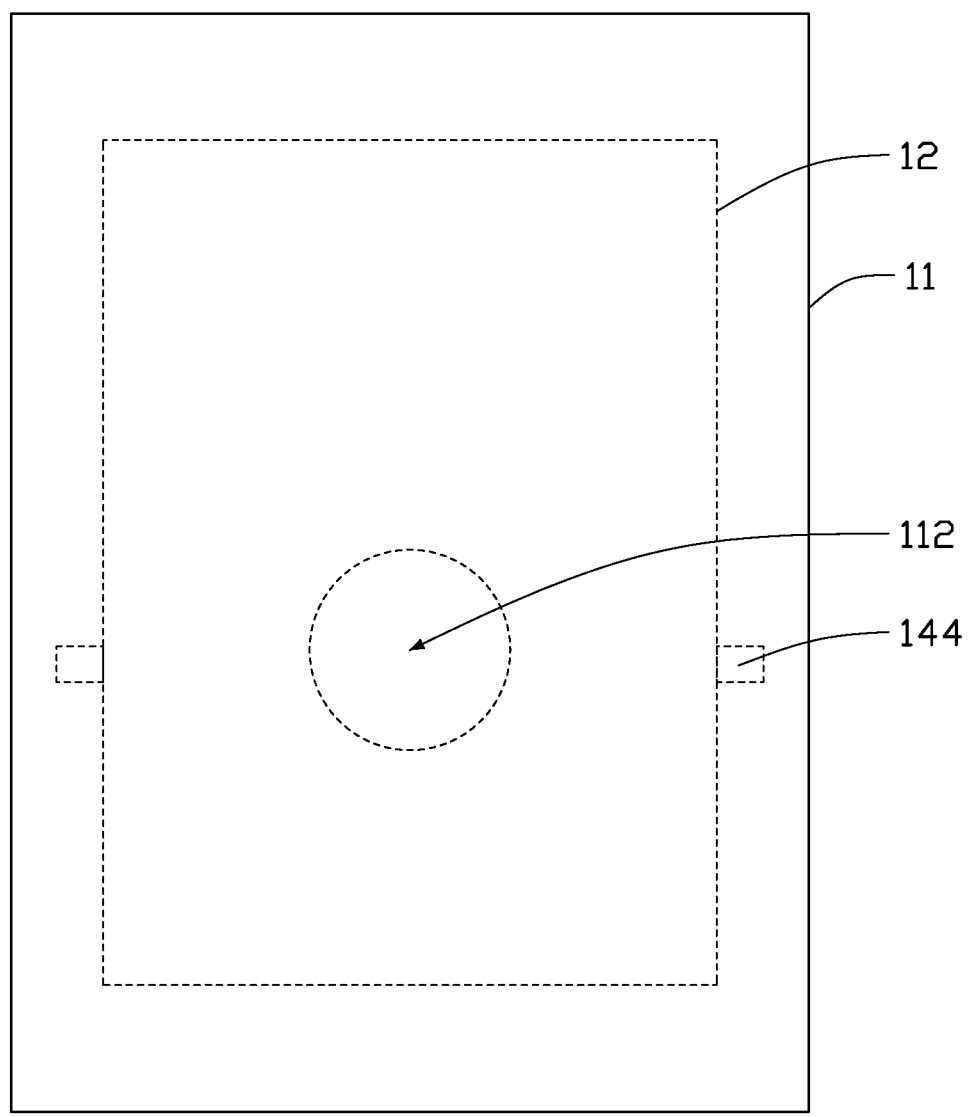
FIG. 7 is a plan view showing an arrangement of supplementary light sources in the display device in FIG. 1.

As shown in FIG. 7, the display panel 12 is substantially rectangular. Two supplementary light sources 144 are on opposite sides of the display panel 12 and are symmetrical with respect to the fingerprint identification area 112. Therefore, the light intensity of the reference light incident on the fingerprint identification area 112 is improved in uniformity.

Figure 8:
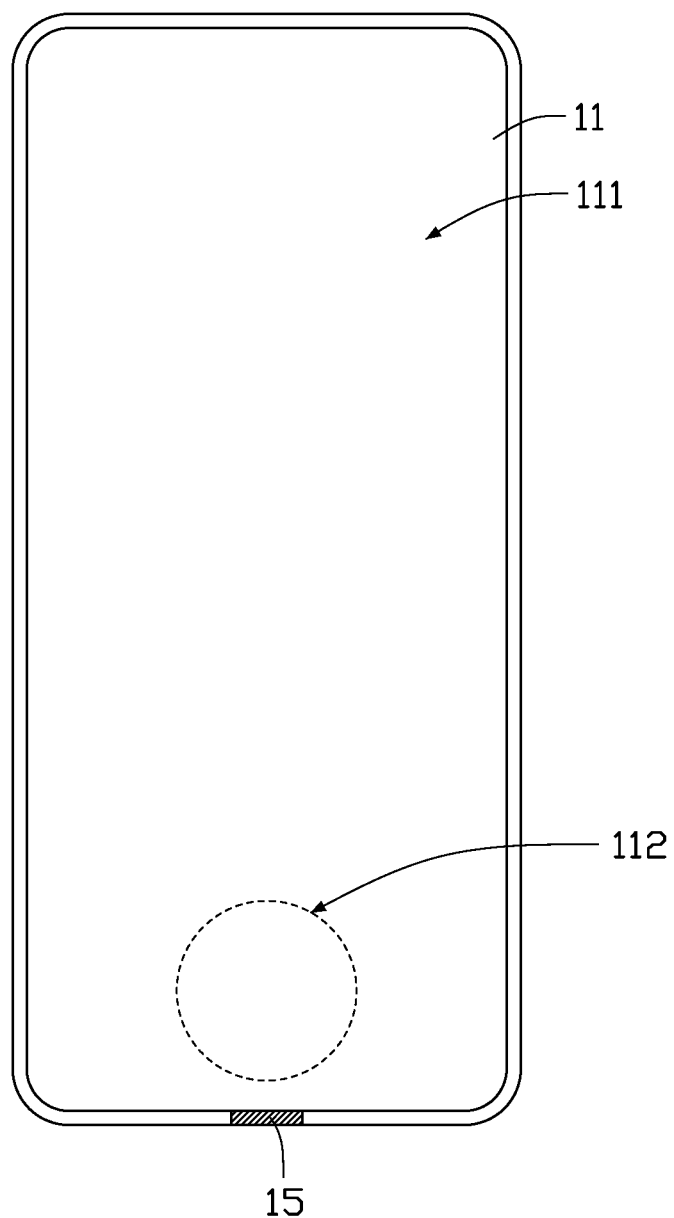
FIG. 8 is a plan view of a display device according to another embodiment.
Figure 9:
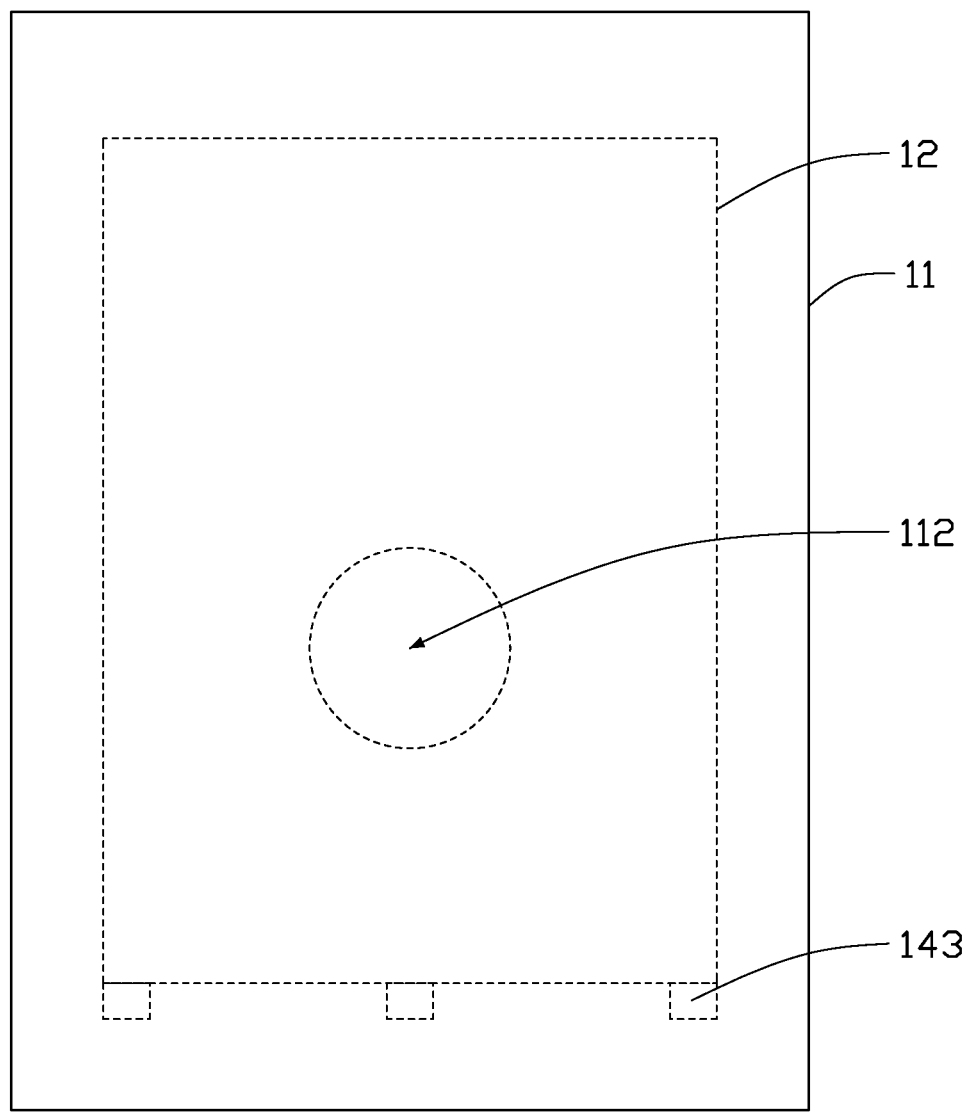
FIG. 9 is a plan view showing an arrangement of supplementary light sources in a display device according to another embodiment.
Figure 10:
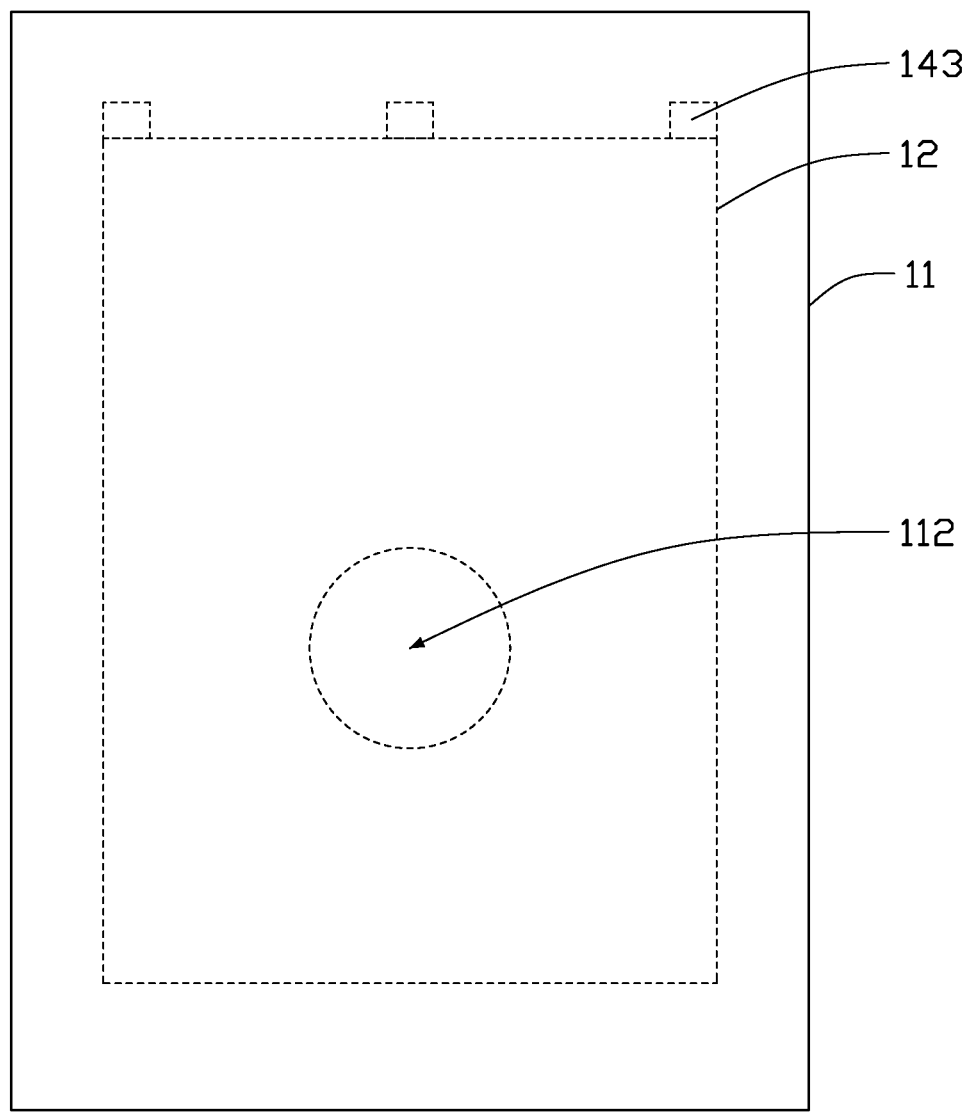
FIG. 10 is a plan view showing an arrangement of supplementary light sources in a display device according to another embodiment.

In another embodiment, as shown in FIG. 8, the fingerprint identification area 112 is at the bottom of the cover plate 11. As shown in FIGS. 9 and 10, the display device 10 includes three supplementary light sources 143, all the three supplementary light sources 143 are on one side of the display panel 12. This arrangement concentrates the reference light incident on the fingerprint identification area 112, and the light intensity of the reference light incident on the fingerprint identification area 112 is enhanced.

In one embodiment, quantity and positions of supplementary light sources can be adjusted according to the position of the fingerprint identification area 112, the length and width of the display device 10, and other parameters.

Figure 11:
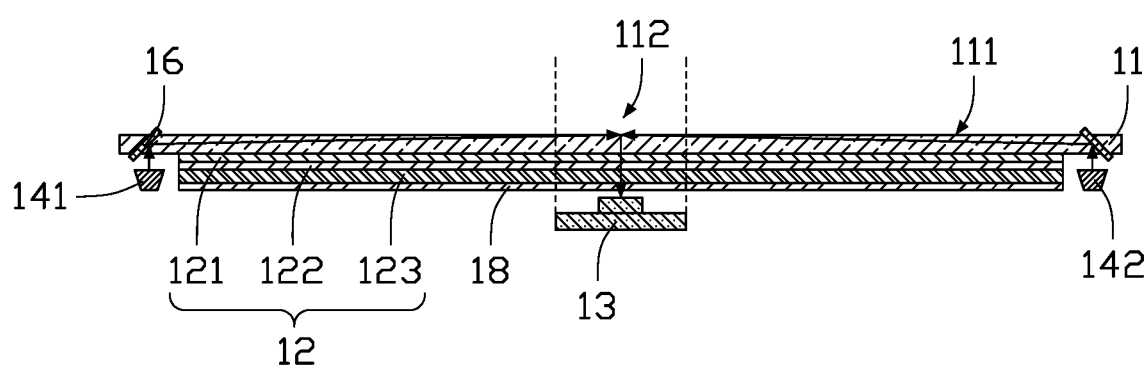
FIG. 11 is a cross-sectional view showing a display device according to another embodiment.

As shown in FIG. 11, the reference light emitted by the supplementary light sources 141 and 142 is perpendicular to the operating surface 111. The display device 10 includes a light guide element 16 on the side of the cover plate 11 away from the operating surface 111. The light guiding element 16 is on an exit path of the reference light and guides the reference light to the fingerprint identification area 112. In one embodiment, the light guiding element 16 is a reflective sheet. In other embodiments, the light guiding element 16 may be a lens, a coated sheet, or the like.

Figure 12:
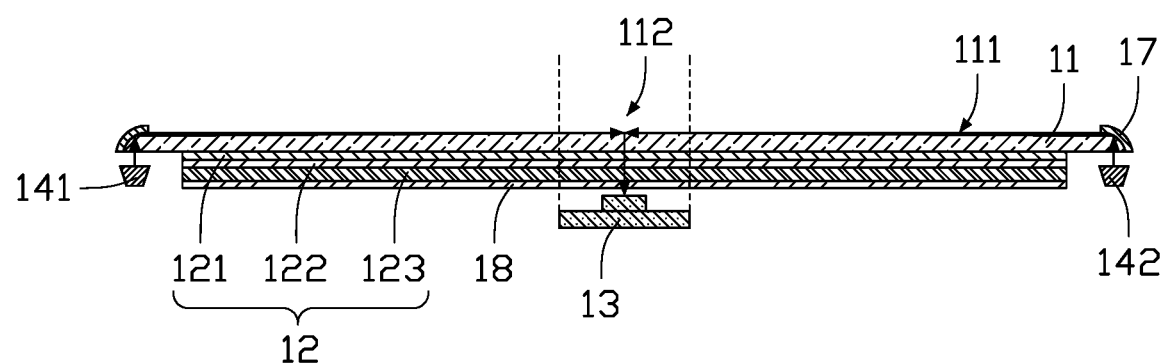
FIG. 12 is a cross-sectional view showing a display device according to another embodiment.

As shown in FIG. 12, the reference light emitted by the supplementary light sources 141 and 142 is perpendicular to the operating surface 111, and there is a reflective material layer 17 on the cover plate 11. The reflective material layer 17 is on the exit path of the reference light and is configured to guide the reference light to the fingerprint identification area 112. In one embodiment, the reflective material layer 17 is light-reflecting paint.

Figure 13:
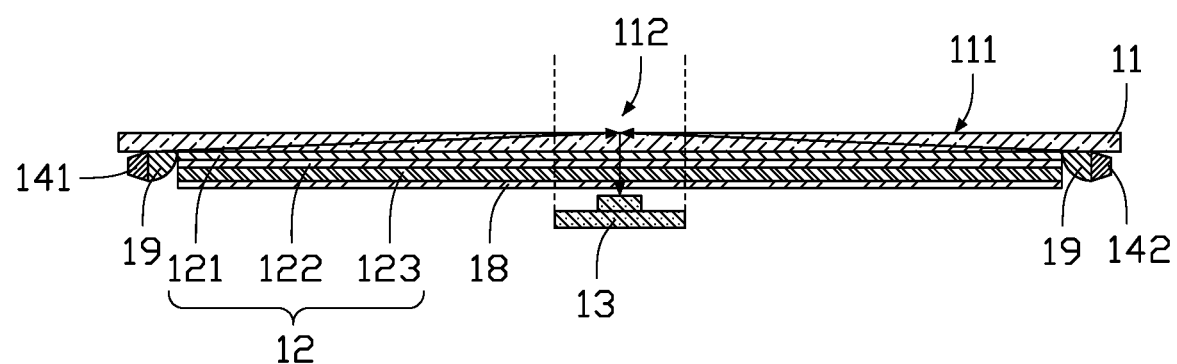
FIG. 13 is a cross-sectional view showing a display device according to another embodiment.

As shown in FIG. 13, the reference light emitted by the supplementary light sources 141 and 142 is parallel to the operating surface 111. The display device 10 includes two refractive material layers 19. Each refraction material layer 19 is fixed to the cover plate 11 and to each of the supplementary light source 141 and the supplementary light source 142. The refraction material layers 19 are used to refract the light emitted by the supplementary light sources to the fingerprint identification area 112. A material of the refractive material layer 19 is selected according to a refraction angle required. In one embodiment, the refractive material layer 19 is made of polymethyl methacrylate (PMMA).

The backlight module 18 transmits the first detection light reflected by the finger, to realize fingerprint recognition in a display device which is not self-illuminated, resolving the problem of limited application for the fingerprint identification module.

It is to be understood, even though information and advantages of the present exemplary embodiments have been set forth in the foregoing description, together with details of the structures and functions of the present exemplary embodiments, the disclosure is illustrative only. Changes may be made in detail, especially in matters of shape, size, and arrangement of parts within the principles of the present exemplary embodiments to the full extent indicated by the plain meaning of the terms in which the appended claims are expressed.

What is claimed is:

1. A display device, comprising:
a cover plate comprising an operating surface, the operating surface defining a fingerprint identification area configure for receiving finger touches, the fingerprint identification area being within an area of the cover plate;
a display panel on a side of the cover plate away from the operating surface;
a backlight module on a side of the display panel away from the cover plate, the backlight module being configured to emit backlight on the display panel which displays images; and
a fingerprint identification module on a side of the backlight module away from the cover plate; and
at least one supplementary light source on a side of the cover plate away from the operating surface, the at least one supplementary light source being configured to emit reference light to the fingerprint identification area;
along a thickness direction of the display device, a projection of the fingerprint identification module on the cover plate at least partially overlaps with the fingerprint identification area;
wherein when a finger touches the operating surface, the backlight incident on the fingerprint identification area is reflected by the finger as a first detection light, and a portion of the reference light incident on the fingerprint identification area is reflected by the finger as a second detection light; the backlight module is further configured to transmit the first detection light and the second detection light; the fingerprint identification module is configured to receive the first detection light and the second detection light by an internal photodetection element and perform analysis on the first detection light and the second detection light by a pre-stored program to identify the fingerprint;
wherein the reference light emitted by the at least one supplementary light source is parallel to the operating surface, the display device further comprises a refractive material layer, the refractive material layer is fixed to and in direct contact with both the cover plate and the at least one supplementary light source and is configured to refract the reference light to the fingerprint identification area.

2. The display device of claim 1, wherein the backlight module comprises a back plate, a reflective sheet, a light guide plate, and at least one optical film;
the back plate, the reflective sheet, the light guide plate, and the at least one optical film are stacked as stated in a direction away from the fingerprint identification module;
the reflective sheet, the light guide plate and the at least one optical film are configured to transmit the first detection light;
the back plate defines an opening, and along the thickness direction of the display device, a projection of the opening on the fingerprint identification area at least partially overlaps with the projection of the fingerprint identification module on the fingerprint identification area.

3. The display device of claim 2, wherein along the thickness direction of the display device, the projection of the fingerprint identification module on the cover plate and a projection of the opening on the cover plate are both coincident with the fingerprint identification area.

4. The display device of claim 2, wherein along the thickness direction of the display device, the projection of the fingerprint identification module on the cover plate is larger than a projection of the opening on the cover plate.

5. The display device of claim 2, wherein the display panel comprises a color filter substrate, a thin film transistor substrate and a liquid crystal layer;
   the color filter substrate is closer to the cover plate than the thin film transistor substrate to the cover plate;
   the liquid crystal layer is between the color filter substrate and the thin film transistor substrate.

6. The display device of claim 1, wherein the refractive material layer is made of polymethyl methacrylate.

7. The display device of claim 1, wherein the at least one supplementary light source is adjacent to the display panel.

8. The display device of claim 7, wherein the display device comprises a plurality of the supplementary light sources, and the plurality of supplementary light sources is symmetrical with respect to the fingerprint identification area.

9. The display device of claim 1, wherein the reference light is infrared light.

10. The display device of claim 9, wherein a surface of the cover plate adjacent to the at least one supplementary light source is coated with infrared light-transmitting ink; and the infrared light-transmitting ink is configured to transmit the reference light.

11. The display device of claim 9, wherein each of the at least one supplementary light source is an infrared light emitting diode.

* * * * *